(12) United States Patent
Sukeda et al.

(10) Patent No.: US 6,545,954 B2
(45) Date of Patent: Apr. 8, 2003

(54) OPTICAL DISK DEVICE USING A RECORDING MEDIUM STRUCTURALLY ARRANGED TO GENERATE A RECORDING CLOCK

(75) Inventors: Hirofumi Sukeda, Tokorozawa (JP); Hideki Saga, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/080,549

(22) Filed: Feb. 25, 2002

(65) Prior Publication Data

US 2002/0075764 A1 Jun. 20, 2002

Related U.S. Application Data

(63) Continuation of application No. 09/550,601, filed on Apr. 17, 2000, which is a continuation of application No. 09/011,486, filed as application No. PCT/JP95/01585 on Aug. 9, 1995, now Pat. No. 6,125,084.

(51) Int. Cl.[7] .............................................. G11B 11/00
(52) U.S. Cl. .................. 369/13.27; 369/47.53
(58) Field of Search .......................... 369/13.27, 13.26, 369/47.53, 47.49, 116, 124.15, 124.14, 59.1, 53.36

(56) References Cited

U.S. PATENT DOCUMENTS

| 4,472,748 A | | 9/1984 | Kato et al. | |
|---|---|---|---|---|
| 5,485,433 A | | 1/1996 | Satomura et al. | |
| 5,537,381 A | * | 7/1996 | Fuji | 369/116 |
| 5,590,111 A | * | 12/1996 | Kirino et al. | 369/116 |
| 5,629,913 A | * | 5/1997 | Kaku et al. | 369/54 |
| 5,642,343 A | | 6/1997 | Toda et al. | |
| 5,732,061 A | | 3/1998 | Kirino et al. | |
| 5,737,301 A | | 4/1998 | Miyamoto et al. | |
| 5,761,171 A | * | 6/1998 | Tobita | 369/59 |
| 5,831,943 A | * | 11/1998 | Kurita et al. | 369/13 |
| 5,862,103 A | * | 1/1999 | Matsumoto et al. | 369/13 |
| 6,115,350 A | * | 9/2000 | Furuta et al. | 369/116 |
| 6,125,085 A | * | 9/2000 | Fuji et al. | 369/13 |
| 6,310,848 B1 | * | 10/2001 | Ueki | 369/53.37 |
| 6,320,832 B1 | * | 11/2001 | Nakao et al. | 369/47.53 |

FOREIGN PATENT DOCUMENTS

| JP | 57-117106 | 7/1982 |
|---|---|---|
| JP | 61-190741 | 8/1986 |
| JP | 1-292603 | 11/1989 |
| JP | 3-91124 | 4/1991 |
| JP | 4-61028 | 2/1992 |
| JP | 5-189827 | 7/1993 |
| JP | 6-36377 | 2/1994 |

* cited by examiner

*Primary Examiner*—Tan Dinh
(74) *Attorney, Agent, or Firm*—Antonelli, Terry, Stout & Kraus, LLP

(57) ABSTRACT

A high-speed large capacity file system is built in which the track density is improved by applying a highly precise magnetic domain width control technique to a light pulse-irradiated magnetic field modulation magnetooptical disk device which can be overwritten and is suitable for the improvement of the bit density. For the purpose, bipolar magnetic domains having edges of positive and negative polarities with respect to the direction of movement of a light spot are formed and the recording condition is optimized. Normal recording is carried out on the basis of the result of the optimization of the recording condition.

11 Claims, 10 Drawing Sheets

OPTICAL DISK DEVICE USING A RECORDING MEDIUM STRUCTURALLY ARRANGED TO GENERATE A RECORDING CLOCK

CROSS-REFERENCE TO RELATED APPLICATION

This application is a continuation of application Ser. No. 09/550,601, filed Apr. 17, 2000, which is a continuation of application Ser. No. 09/011,486, filed Feb. 4, 1998, now U.S. Pat. No. 6,125,084, which is a 371 of PCT/JP95/01585, filed Aug. 9, 1995, which is incorporated herein by reference.

TECHNICAL FIELD

The present invention relates to an information recording/reproducing apparatus for recording or reproducing information on or from an optical recording medium, and more particularly to a method and an apparatus for realizing high density recording/reproducing by applying a magnetic field modulation magnetooptical recording method to an optical disk.

BACKGROUND ART

A magnetic field modulation magnetooptical recording/reproducing method has been known conventionally as a technique of making an optical disk highly dense.

As one example of conventional techniques, a consecutive light pulse irradiation and magnetic field modulation method described in JP-A-1-292603 and applied to an optical disk drive will be described. With this disk drive, clock signals are obtained from a preformatted clock pit train on an optical disk of a sample-servo format.

As shown in FIG. 8, while high output light pulses 802 synchronizing with clock signals 801 are irradiated, modulation magnetic fields 808 corresponding to data 803 are applied synchronously with the light pulses 802 to form magnetic domains 804. During the reproduction, the data 803 is detected by using the same clock signals 801. The characteristic feature of this method resides in that the edge distance 807 of the magnetic domain 805 recorded with too large a power is the same as the edge distance 807 of the magnetic domain 804 recorded with too small a power, irrespective of their different recording powers. It is therefore possible to record/reproduce always at a constant edge distance 807 and is suitable for high bit density recording/reproducing.

A second conventional example as a means for solving a recording medium sensitivity fluctuation problem associated with light modulation edge recording will be described with reference to JP-A-4-61028. According to the second conventional example, a recording medium is provided with a trial writing area at a predetermined position and a trial writing pattern is actually recorded in this trial writing area. By evaluating a signal reproduced from this trial area, optimization of a recording power level is performed.

FIG. 7 shows an example of the structure necessary for evaluating a reproduction signal for the optimization of recording conditions according to the second conventional example.

As shown in FIG. 7 at (a), a combination of two shortest/longest recording mark/gap repetition patterns determined from a recording modulation method is used as a trial writing pattern. If a (1,7) modulation method is used as a coding method, the lengths of shortest/longest recording mark/gap are 2 Tw and 8 Tw respectively (Tw is a channel bit length, i.e., a shortest change length of a recording mark, i.e., a detection window width). If the bit length of the recording code train is 0.53 microns, the longest mark/gap length is 3.0 microns. If the laser wavelength is 780 nm and the lens NA is 0.55, the amplitude of a signal reproduced from the repetition pattern (hereinafter called "coarsest pattern") of the longest recording mark/gap (each 8 Tw long) is generally determined only by the width of the recording mark, and the positions of leading and trailing edges of a signal correspond to the edge positions. On the other hand, the amplitude of a signal reproduced from the repetition pattern (hereinafter called "densest pattern") of the shortest recording mark/gap (each 2 Tw long) is smaller than the coarsest pattern because the recording mark/gap length is generally equal to a half the diameter of the reproduction light spot. The center level of the reproduction signal amplitude shifts toward the recording mark because of optical interference of the preceding and succeeding recording marks. This shift amount is influenced by both the length and width of the recording mark. The longer and wider the recording mark, the larger the shift amount. From the above consideration, the recording control has been performed so that the width of the recording mark becomes generally constant irrespective of the recording mark length, and the recording power level has been optimized by making the amplitude center level determined by the recording mark/gap (e.g., coarsest pattern) sufficiently longer than the diameter of the reproduction light spot become coincident with the reproduction signal center level of the densest pattern.

In the structure shown in FIG. 7 at (d) and disclosed in the above-cited publication, the center level of the amplitude of a signal reproduced from the densest/coarsest pattern is obtained as an average value of signal levels representative of the upper and lower envelopes. The peak and bottom levels of the reproduction signal 701 of the densest pattern are held by peak and bottom holding circuits 704 and 705, and the average level of the peak and bottom levels is held by a sample-hold circuit 707 by using a densest pattern detection gate 702 as a trigger. Similarly, the average level of a reproduction signal of the coarsest pattern is held by a sample-hold circuit 706 by using a coarsest pattern detection gate 703 as a trigger. A difference (V1−V2) between the two average levels is calculated by a differential amplifier circuit 708 to obtain a reproduction signal evaluation result signal 713 ($\Delta V$ signal: $\Delta V = V1 - V2$). The center level of a signal reproduced from the coarsest pattern changes scarcely even if the recording conditions shift more or less from the optimum conditions and recording mark/gap lengths are unbalanced more or less.

The structure shown in FIG. 7 at (e) is also disclosed in the above-cited publication as a method of evaluating the recording conditions from a reproduction signal. By using a low-pass filter 709 having a cut-off frequency lower than the frequency of a reproduction signal of the coarsest pattern, signal levels of the densest/coarsest patterns are sampled and held to form a reproduction signal evaluation result signal 714 ($\Delta V$ signal). The recording power has been optimized by setting the recording power level so that $\Delta V$ becomes 0. In this manner, recording can be performed always with generally a constant magnetic domain width.

FIG. 9 is a flow chart illustrating a basic sequence of the recording condition optimizing operation of the second conventional example. In this example, it is assumed that the recording medium is an optical disk and the trial writing pattern is a densest/coarsest pattern. When the recording condition optimizing operation starts, a trial writing area provided on a recording medium at a predetermined position is erased to prepare for the next writing operation. As the writing operation starts, a predetermined writing pattern is recorded on the recording medium under different recording conditions for each recording area (e.g., sector) which is the unit of recording management of the recording medium. After the recording operation is finished, the reproduction signal of each recording area is evaluated to determine the recording conditions most suitable for the optimum recording conditions. Since the recording conditions are different in the radial direction of the recording medium, the above recording operation is performed at proper radial positions of the recording medium (e.g., inner circumferential area, middle circumferential area, outer circumferential area, or each recording zone) to complete the trial writing operation.

DISCLOSURE OF INVENTION

High speed and high integration of external storage devices or the like of computers have been long desired. As described with the related art, the magnetic field modulation magnetooptic recording method with light pulse irradiation is expected greatly because it allows overwrite and a bit density is high. Furthermore, this method has the characteristics that an edge distance of a magnetic domain does not change and the reproduction signal waveform is not affected, even if a recording power changes.

This method is, however, associated with the problem that it is difficult to detect that the width of a magnetic domain becomes too broad by applying an excessive power, because the reproduction signal is too stable. This becomes a serious issue preventing the improvement of a track density. Even if the trial writing operation is performed by the method of the second conventional example, the reproduction signal evaluation result signal (? V signal) will not change in principle. It is therefore impossible to record a magnetic domain with a precise width. If the trial writing operation is performed with an excessive power in particular, data on adjacent tracks may be destroyed. In order to avoid destroying data on adjacent tracks, it is essential to reserve a sufficient track width, so that high density cannot be expected. Another problem is medium compatibility that the driver cannot determine an optimum power of a medium having a different recording sensitivity.

As above, conventional magnetic field modulation recording methods are associated with the problem that they cannot improve the track density sufficiently and with the problem of medium compatibility.

An object of the present invention is to improve the area recording density by narrowing the recording mark width to have narrow tracks and to suppress a recording reproduction variation between recording/reproducing apparatuses.

The above object can be achieved by performing a trial writing operation of data in a predetermined area of a recording medium by a method different from a normal information recording, adjusting the light pulse output in accordance with the domain size information obtained by the trial writing operation, and after confirming the adaptability between the recording medium and a recording/reproducing apparatus, starting recording ordinary data.

In recording/reproducing by an optical information recording/reproducing apparatus, a trial writing operation is performed by a recording method providing a high detection sensitivity of a magnetic domain size or recording mark size, and in accordance with the results of the trial writing operation, normal information recording is performed. It becomes possible, therefore, to precisely control the magnetic domain size or recording mark size and the width of the magnetic domain or recording mark. In this manner, the recording density of an optical information recording/reproducing apparatus can be improved greatly.

BEST MODE FOR CARRYING OUT THE INVENTION

Embodiments of the invention will be described hereinunder.

Figure 1:
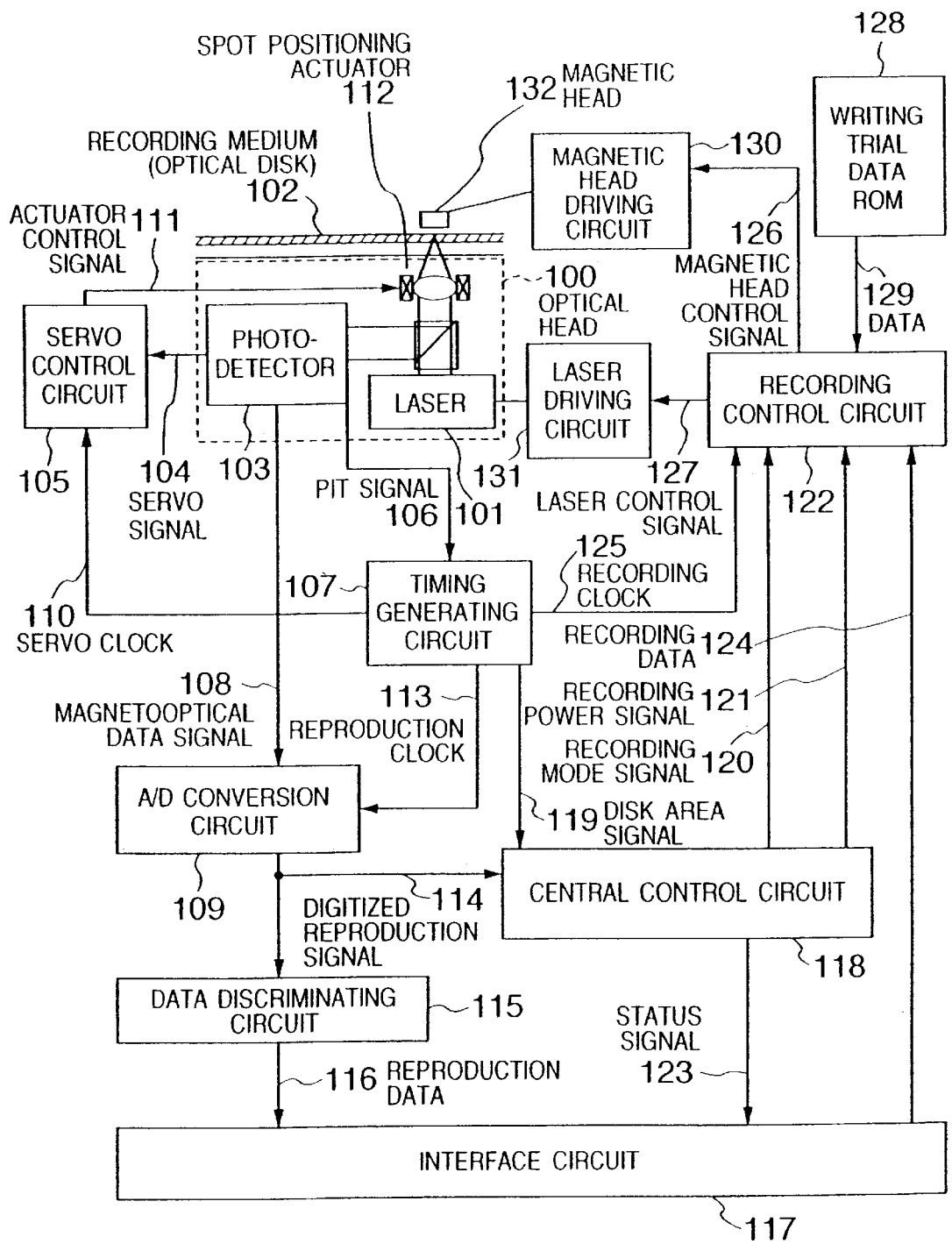
FIG. 1 is a block diagram showing the structure of a drive according to the invention.

FIG. 1 is a block diagram showing an example of the structure of a drive according to the invention. An optical head 100 focusses a laser beam irradiated from a laser 101 onto a recording medium (optical disk) 102. The recording medium 102 is not limited only to a disk, but it may be a tape, a card or the like to realize the same embodiment configuration. The laser beam reflected from the recording medium 102 is introduced into a photodetector 103 and converted into various electrical signals by known techniques. Of these electrical signals, a servo signal 104 is supplied to a servo control circuit 105, a pit signal 106 is supplied to a timing generating circuit 107, and a magnetooptic data signal 108 is supplied to an A/D conversion circuit 109.

A servo clock 110 generated by the timing generating circuit 107 in accordance with the pit signal 106 is supplied, together with the servo signal 104, to a servo control circuit 105 which in turn generates an actuator control signal 111. The actuator control signal 111 is supplied to a spot positioning actuator 112 to position a light spot on the recording medium 102.

During a normal information reproduction, the A/D conversion circuit 109 digitizes the magnetooptical data signal 108 at the timing of a reproduction clock 113 generated by the timing generating circuit 107, to thereby output a digitized reproduction signal 114. The digitized reproduction signal 114 is converted by a data discriminating circuit into a reproduction signal which is output to an interface circuit 117.

During a normal information reproduction, the A/D conversion circuit 109 digitizes the magnetooptical data signal 108 at the timing of a reproduction clock 13 generated by the timing generating circuit 107, to thereby output a digitized reproduction signal 114. The digitized reproduction signal 114 is converted by a data discriminating circuit 115 into a reproduction signal which is output to an interface circuit 117.

Figure 8:
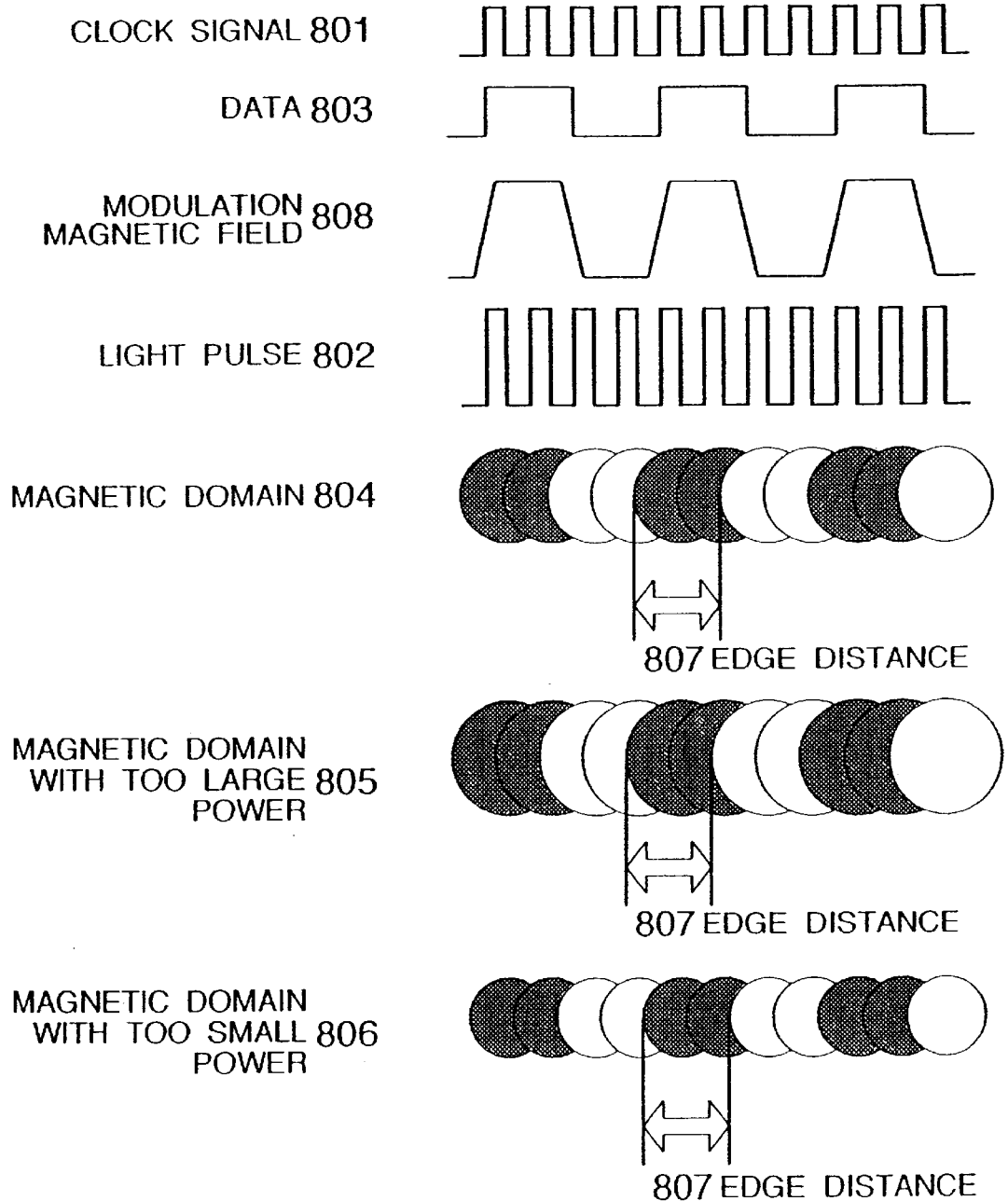
FIG. 8 is a conceptual diagram showing an example of light pulse modulation magnetic field modulation.
Figure 9:
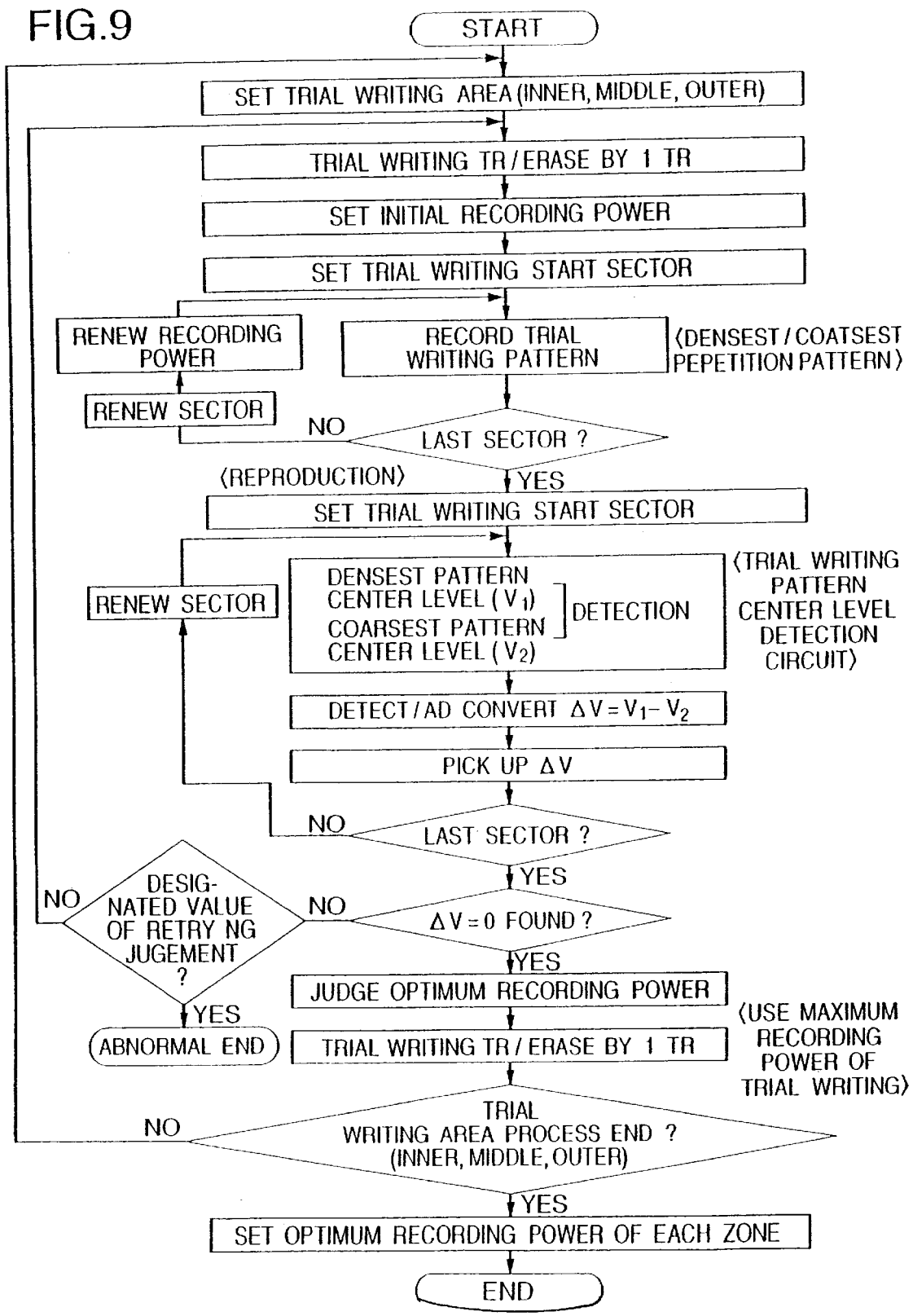
FIG. 9 is a flow chart illustrating a trial writing operation sequence.

Under these conditions, the interface circuit 117 supplies recording data 124 to the recording control circuit 122 which in turn outputs a magnetic head control signal 126 and a laser control signal 127 synchronizing with a recording clock 125. The laser control signal 127 is a signal representative of a consecutive pulse train with a constant period and of a power, both synchronizing with the recording clock 125. The magnetic head control signal 126 is a signal representative of the recording data 124 delayed to make its phase coincident with that of the laser control signal 127. As a result, the magnetic head 132 and laser 101 output light pulses 802 and modulation magnetic fields 808 such shown in FIG. 8.

The outline of the operation of a trial writing mode of the drive according to the invention will be described. As the drive is initialized upon turning on a drive power or the like, the central control circuit 18 first checks whether a recording medium 102 is set in the drive. If not, the operation stands by, whereas if set, the central control circuit 118 performs a recording optimizing operation in order to confirm adaptability between the recording medium 102 and drive. The operation of the drive will be specifically described hereinafter. When a light spot is positioned in a specific trial writing area of the recording medium, in response to the pit signal 106 the timing generating circuit 107 supplies the disk area signal 119 to the central control circuit 118 to notify that the light spot is positioned in the trial writing area. Upon reception of the disk area signal 119, the central control circuit 118 sends the recording mode signal 120 indicating the trial writing mode to the recording control circuit 122.

Upon reception of the recording mode signal 120, the recording control circuit 122 starts a recording operation by using data in a trial writing data ROM 128, not by using the recording data 124 from the interface circuit 117 as in the normal recording. The trial writing data ROM 128 stores therein consecutive "0s" data and recording condition optimizing data (trial writing pattern). First, in accordance with the consecutive "0s" data, the recording control circuit 122 outputs the magnetic head control signal 126 for applying a magnetic field in the erase direction and the laser control signal 127 for irradiating consecutive pulse light. In accordance with the magnetic head control signal 126 and laser control signal 127, the magnetic head driver circuit 130 and laser driver circuit 131 perform a trial writing area erase operation.

If some recording magnetic domains are left unerased because of an insufficient laser power, the erase operation is performed not only on the subject track but also on the intermediate area between adjacent tracks, through tracking servo, in order to ensure a perfect erase state.

The recording condition optimizing operation then starts for the trial writing area with recording magnetic domains being erased, by outputting the recording condition optimizing data (trial writing pattern) 129 from the trial writing data ROM 128. In this recording condition optimizing operation, the central control circuit 118 operates to actually write a predetermined digitized trial writing pattern to be described later, and determines the optimum writing conditions in accordance with the evaluation results of a digitized reproduction signal 114 reproduced from the recording pattern. The recording condition optimizing operation is performed at a proper time interval and when the recording medium 102 is exchanged. With this combination of recording condition optimizing operations, magnetic domains having generally a constant width can be stably formed and the reliability of the drive can be improved.

A simple method of determining the optimum recording conditions will be described with reference to FIG. 10. While high output light pulses 154 synchronizing with clock signals 151 generated from a pre-pit train are irradiated, modulation magnetic fields 153 corresponding to data 152 are applied synchronously with the light pulses 154 to form magnetic domains 155 to 157. In this case, consecutive "0s" and "1" in the data 152 are set sufficiently long.

From the magnetic domains 155 to 157 recorded by trial writing, magnetooptic data signals 165 to 167 are reproduced which are A/D converted synchronously with reproduction clock signals 158 to obtain portions of digitized reproduction signals 114, including V11, V12, V13, V14, V15, V16, and V17. These signal portions are classified into an erase level V11, transition levels V12 to V14, and recording levels V15 to V17. As the recording power changes and the magnetic domain edges shift, the transition levels greatly change among V12 to V14. In contrast, the recording levels V15 to V17 change less. The erase level and the recording level are required to take a saturated level. It is therefore necessary to set each trial writing pattern sufficiently longer than a light spot diameter.

The central control circuit 118 receives V11 to V17 of the digitized reproduction signals 114, and calculates a value of (transition level–erase level)/(recording level–erase level). Based upon the calculated value of (transition level–erase level)/(recording level–erase level), the central control circuit 118 can estimate the size of each magnetic domain recorded by trial writing.

The value of (transition level–erase level)/(recording level–erase level) takes a number larger than 0 and smaller than 1. For example, in the example shown in FIG. 10, the target value of (transition level–erase level)/(recording level–erase level) for a target magnetic domain size is about 0.5. The central control circuit 118 performs the trial writing while scanning the recording power 408, and selects as the optimum recording power the recording power used when the value of (transition level–erase level)/(recording level–erase level) calculated from the reproduction signals becomes most nearest to 0.5. Since the value of (transition level–erase level)/(recording level–erase level) is affected by a shift of the clock signals 153 and 158, these clock signals 153 and 158 are required to be stable.

Figure 10:
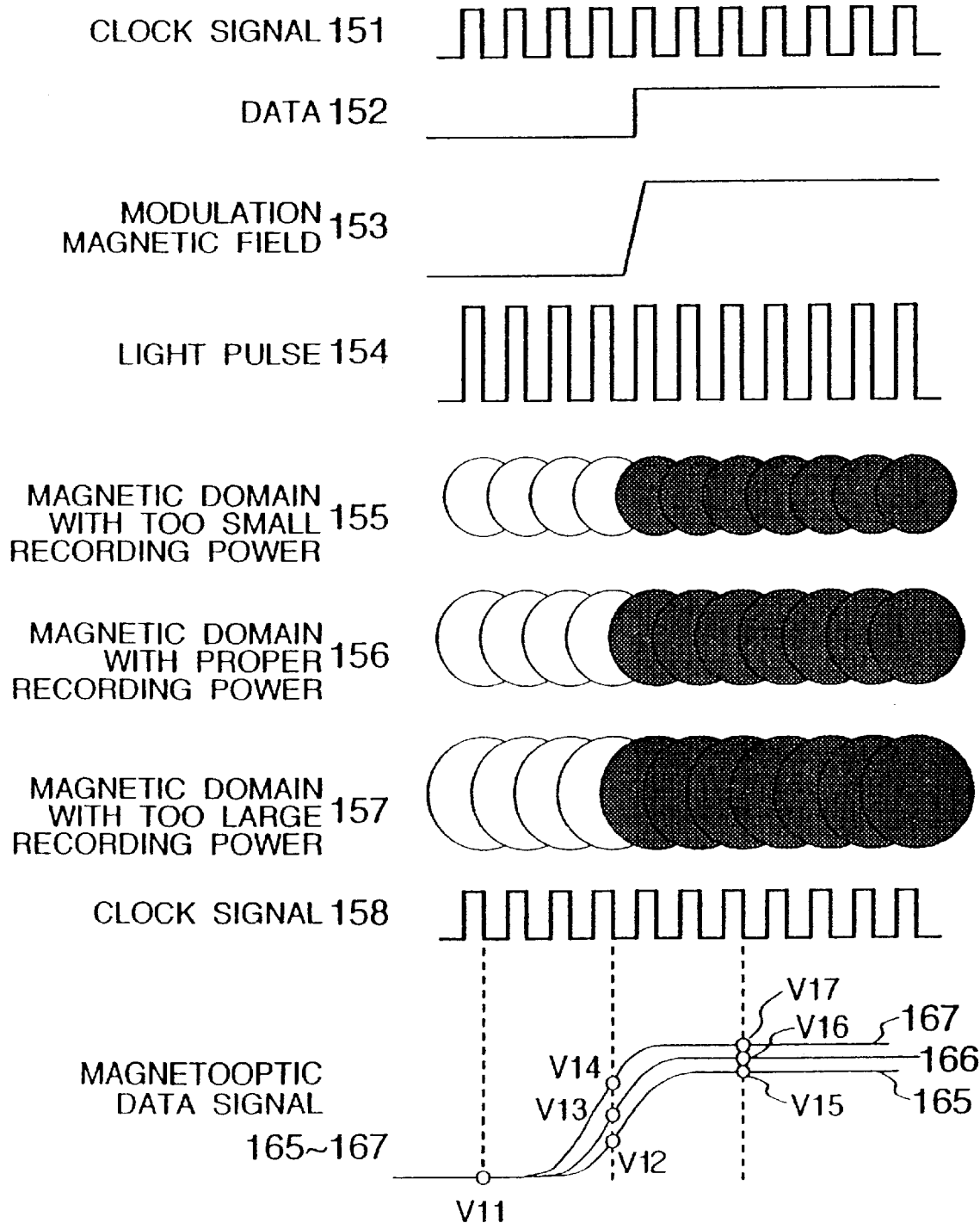
FIG. 10 is a conceptual diagram illustrating a simplified trial writing operation.

In the above manner, the recording conditions of forming magnetic domains (recording marks) having generally a constant width can be found by the simple method illustrated in FIG. 10.

A more precise trial writing method will be described with reference to FIGS. 2 and 3. In the following, the operations in the trial writing mode of the recording control circuit 122 and laser driver circuit 131 shown in FIG. 1 will be described. After the erase operation for the trial writing area, the recording control circuit 128 performs a recording operation by using the data (trial writing data) 129 stored in the trial writing data ROM 128. If the recording medium 102 has a narrow track pitch, a trial writing is controlled so as not to write the data on nearest adjacent tracks of the subject track, so that the magnetooptic data signals 108 on the trial written subject track will not interfere with each other.

Figure 2:
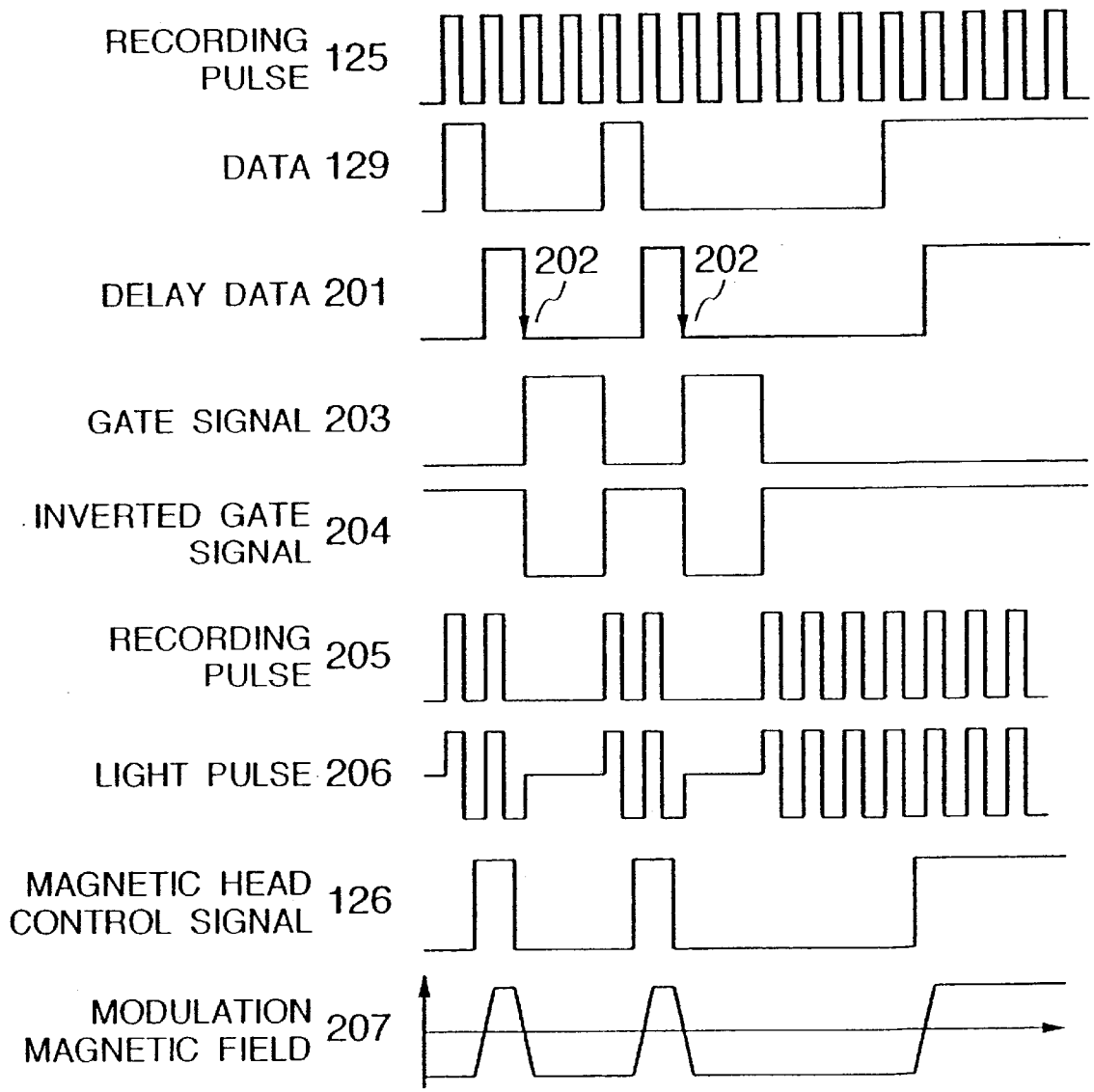
FIG. 2 shows waveforms of a record control circuit of this invention.

FIG. 2 shows examples of recording clocks 125 and data 129. The data 129 is delayed by one clock to form delay data 201. A gate is opened during two clocks after the trailing edge timing 202 of the delay data 201 to form a gate signal 203. The gate signal 203 is inverted to form an inverted gate signal 204. An AND operation is performed between the inverted gate signal 204 and recording clocks 125 to form recording pulses 205.

Figure 3:
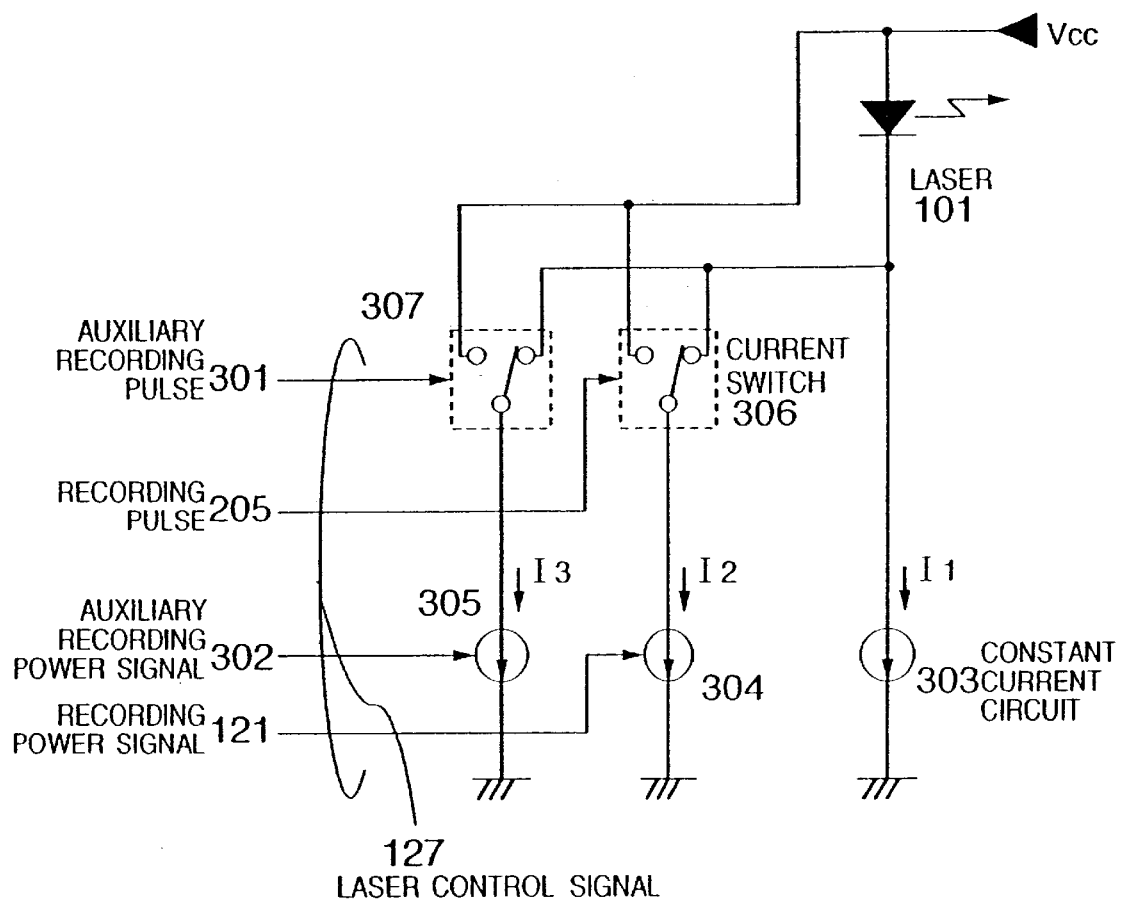
FIG. 3 is a circuit diagram of a laser drive circuit of the invention.

The gate signal 203 is used as an auxiliary recording pulse 301 shown in FIG. 3. The recording power signal 121 supplied from the central control circuit 118 is halved to form an auxiliary recording power signal 302. The recording control circuit 122 supplies the recording pulse 205, recording power signal 121, auxiliary recording pulse 301 and auxiliary recording power signal 302 to the laser driver circuit 131, as the laser control signal 127. The recording power signal 121 and auxiliary recording power signal 302 are input to constant current circuits 304 and 305, respectively, to set current value I2 and I3. The constant current circuit 303 flows a reproduction bias current I1 in a steady manner. The recording pulse 205 and auxiliary recording pulse 301 operate to open and close current switches 306 and 307, respectively, so that the laser 101 irradiates light pulses 206 shown in FIG. 2. The recording control circuit 122 delays the data 120, while taking a delay in the magnetic head driver circuit 130 into consideration, to form the magnetic head control signal 126 which is input to the magnetic head driver circuit 130 to generate the modulation magnetic field 207 from the magnetic head 132.

Figure 4:
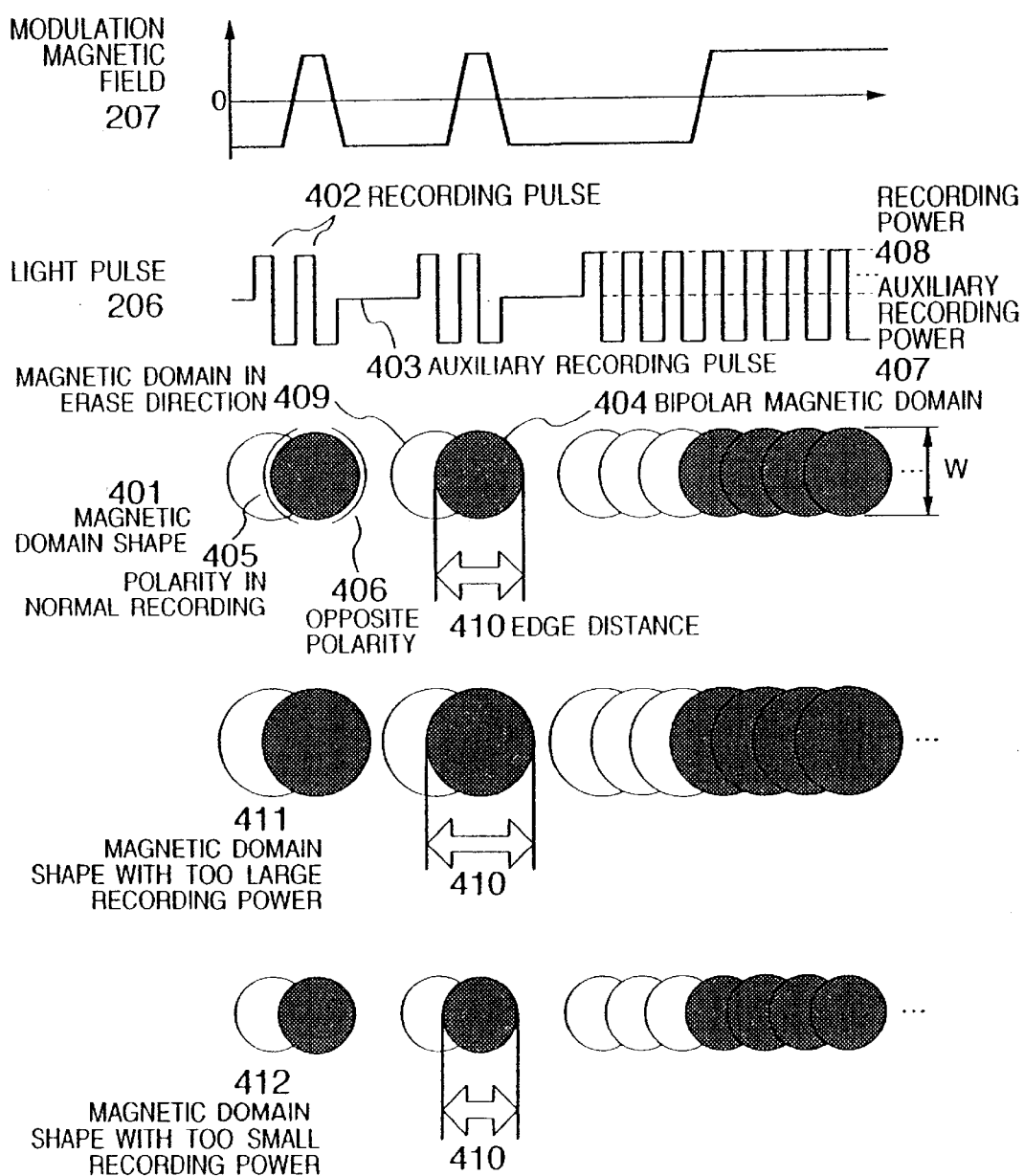
FIG. 4 is a conceptual diagram illustrating a trial writing method of the invention.

With reference to FIG. 4, the shape 401 of a magnetic domain formed upon application of the light pulse 206 and modulation magnetic field 207 will be described.

Immediately after a recording pulse 402, an auxiliary recording pulse 403 is introduced which does not raise the medium temperature to the recording temperature and is not directly relevant to recording. With the introduction of this auxiliary recording pulse 403, a bipolar magnetic domain 404 having an edge shape of an opposite curvature 406 to the polarity 405 in the normal recording can be recorded. Although the auxiliary recording power may be 0, a good balance is ensured if the auxiliary recording power 407 is set to a half the recording power 408. Namely, since the pulse width of one bit of the auxiliary recording pulse 403 is a twofold of the pulse width of one bit of the recording pulse 402 and since the auxiliary recording power 407 is a half the recording power 409, the light energy amount of one bit of the auxiliary recording pulse 403 can be set equal to that of one bit of the recording pulse 402. Since a peak temperature by one light pulse is different between the auxiliary recording pulse and the recording pulse, only the recording pulse 402 forms a magnetic domain. However, both the recording pulse 402 and the auxiliary recording pulse 403 have the same thermal influence to the following recording area on the track. Accordingly, the magnetic domain size by one recording pulse is always maintained equal to the normal recording.

In the example shown in FIG. 4, a magnetic domain 409 in the erase direction indicated by a while circle is formed by the recording pulse 402 immediately before the bipolar magnetic domain 404. Therefore, even if there is a difference in a strict sense between the thermal influence of the auxiliary recording pulse 403 and the thermal influence of the recording pulse 402, this thermal influence difference can be reduced considerably. The magnetic domain shape 401 formed in the above manner has the characteristics that the magnetic domain width W is the same as that of the normal recording although a different recording method is applied, and that only the edge distance of the magnetic domain changes with the recording power 408. The magnetic domain shape 411 with too large a recording power and the magnetic domain shape 412 with too small a recording power are shown in the lower portion of FIG. 4.

Figure 5:
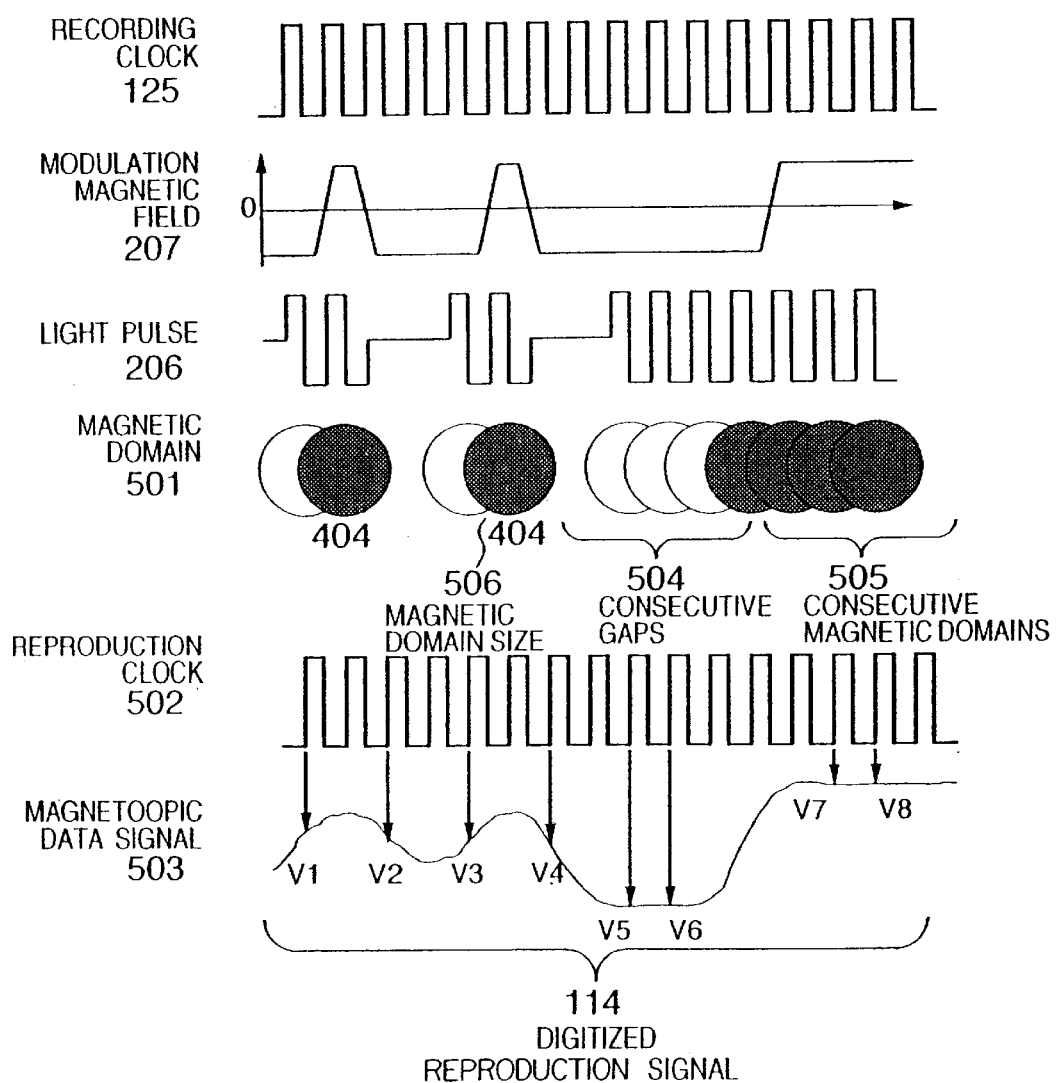
FIG. 5 is a conceptual diagram illustrating how an optimized record state is found according to the invention.

With reference to FIG. 5, how the optimum recording conditions are found will be described. A magnetooptic data signal 503 shown in FIG. 5 is reproduced from magnetic domains 501 recorded by the trial writing. Attention is drawn to signals V1, V2, V3, V4, V5, V6, V7 and V8 among digitized reproduction signals 114 A/D converted from the magnetooptic data signal 503 at reproduction clocks 502. The central control circuit 118 receives V1 to V8 of the digitized reproduction signals 114 and calculates the following values, including an average level A (V1+V2+V3+V4)/4 of bipolar magnetic domains 404, a level B=(V5+V6)/2 of consecutive gaps 504, and a level C=(V7+V8)/2 of consecutive magnetic domains 505. In accordance with the calculated value (C−A)/(C−B), the central control circuit 118 can estimate a size 506 of the magnetic domain recorded by the trial writing.

The value (C−A)/(C−B) is larger than 0 and smaller than 1. For example, assuming that the target value of (C−A)/(C−B) for the target magnetic domain size 506 is 0.5, the central control circuit 118 selects as the optimum recording power the recording power used when the value of (C−A)/(C−B) calculated from the reproduction results of the trial writing pattern recorded while scanning the recording power 408 becomes most nearest to 0.5. If the magnetic domain width W is desired to be set small, the target value of (C−A)/(C−B) is set small, whereas if the magnetic domain width W is desired to be set large, the target value of (C−A)/(C−B) is set large.

If a domain shift level D=(V1−V2+V3−V4)/2 and a value of D/(C=B) are calculated, it is possible to detect a shift of a recorded magnetic domain position from the timing of the reproduction clock 502. A shift between the timing of the reproduction clock 502 and the recorded magnetic domain position is an absolute position shift of the center of a magnetic domain on the recording medium 102. Therefore, if the absolute position shift poses some problem, the conditions of obtaining a constant or minimum value of D/(C−B) are selected by the trial writing.

The bipolar magnetic domain 404 in this embodiment is recorded by a single pulse. The bipolar magnetic domain 404 may be recorded by using a train of a plurality of pulses. The bipolar magnetic domain 404 may be recorded in an isolated state from other magnetic domains. A necessary point for high precision trial writing is to record the bipolar magnetic domain 404 having edges of both positive and negative polarities in the moving direction of a light spot as in the case of magnetic domains recorded by a light modulation recording method. In addition to the detection of the consecutive magnetic domain level C and consecutive gap level B, the necessary point during the reproduction is to detect the average level A of the bipolar magnetic domains 404 in such a manner that the magnetooptic data signal 503 is picked up at the timing of the reproduction clock 502 when the light spot comes near to the edges 405 and 406 of positive and negative polarities. The information of the recorded magnetic domain size 506 can also be obtained if the magnetooptic data signal 503 can be picked up synchronously with the timing of the reproduction clock 502 even when about a half area of the light spot covers the edge of the opposite polarity 406.

Figure 6:
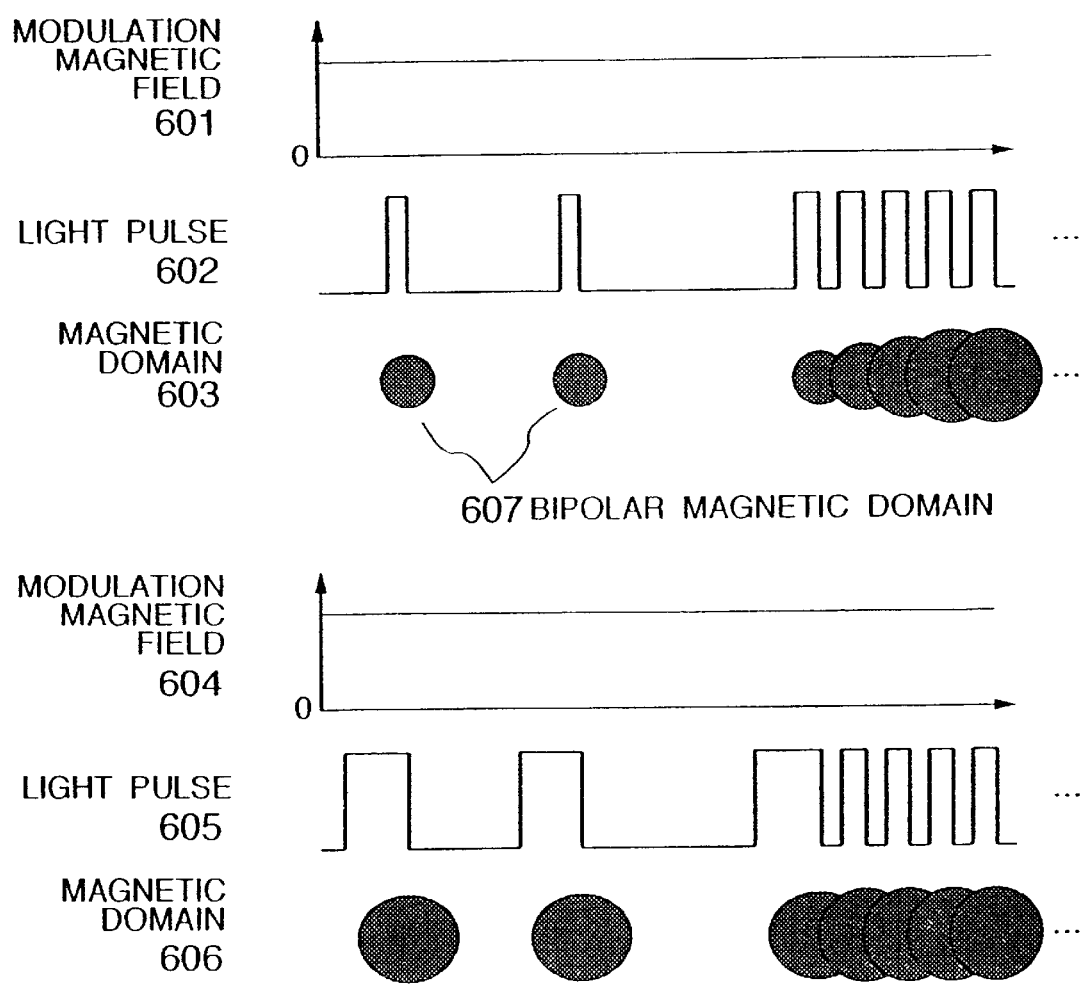
FIG. 6 is a conceptual diagram showing an example of a trial writing operation of the invention.
Figure 7:
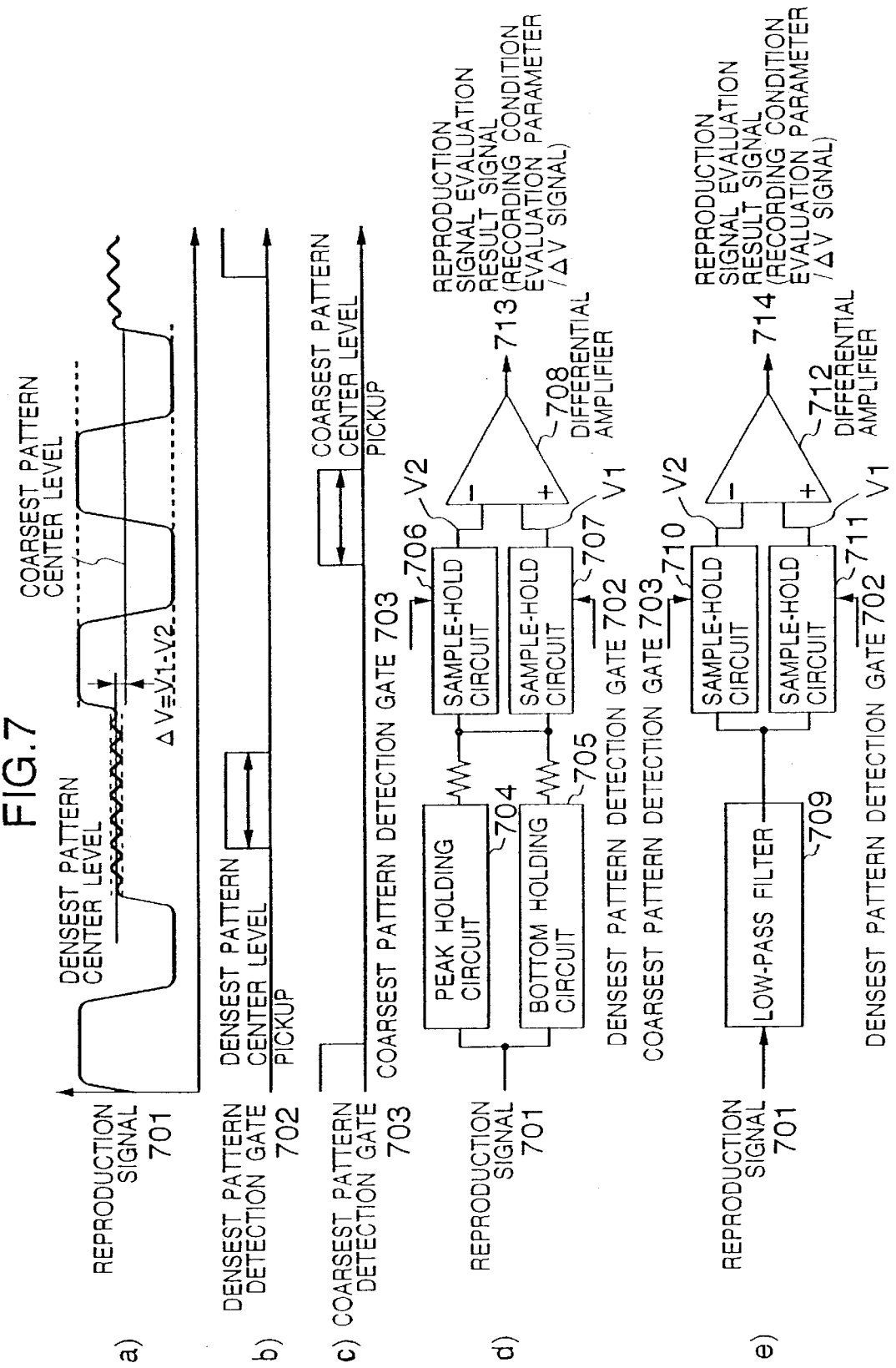
FIG. 7 shows waveforms illustrating a conventional example of a trial writing method.

Other examples are shown in FIG. 6. In these examples, the trial writing is performed solely by light modulation and the recording waveforms shown in FIG. 6 are used. In these examples, however, the target value of (C−A)/(C−B) should be set carefully. For example, magnetic domains 606 recorded by a modulation magnetic field 604 and light pulses 605 have the same magnetic domain size because of recording correction. Therefore, similar to the case shown in FIG. 5, the target value of (C−A)/(C−B) is set to about 0.5. In the case of magnetic domains 603 recorded by a modulation magnetic field 601 and light pulses 602, since the size of bipolar polarity magnetic domains 607 is small, it is necessary to set the target value of (C−A)/(C−B) smaller.

As described so far, magnetic domains having an edge shape of a curvature opposite to that in the normal recording are trial recorded so that magnetic domains (recording marks) having a constant width and a controlled shape can be formed stably and with a high precision, on a recording medium. Accordingly, even if the track pitch of the recording medium 102 is narrowed, the reliability of recording/reproducing can be retained.

Industrial Applicability

According to the present invention, it is possible to suppress a recording sensitivity variation of recording media to be caused by a difference of suppliers, film thickness differences, or environmental temperature changes, to suppress a recording sensitivity variation of recording/reproducing apparatuses, to improve the adaptability between recording/reproducing apparatuses and recording media, to control recording marks with a high precision, and to improve the reliability and storage capacity of recording/reproducing apparatuses.

What is claimed is:

1. An optical disk drive for recording information on a recording medium by forming optical recording marks, comprising:
    a timing generating circuit which generates a recording clock based on an electrical signal obtained by converting a reflected beam from said recording medium;
    a light source which irradiates a light pulse on a specific trial writing area of said recording medium in synchronization with said recording clock;
    a recording circuit which records a trial writing pattern in said specific trial writing area of said recording medium in synchronism with said recording clock;
    a reproducing circuit which reproduces the trial writing pattern from the reflected beams from said recording medium in accordance with said recording clock; and
    a controlling circuit which determines conditions to form said optical recording marks in accordance with a transition level of reproduction signals by said trial writing pattern.

2. An optical disk drive according to claim 1, further comprising an erasing circuit which erases data on a track to be used for the recording of the trial writing pattern and on tracks which are adjacent to said track, prior to the recording of the trial writing pattern.

3. An optical disk drive according to claim 1, further comprising means for enabling recording a recording pattern not appearing in a data area in said specific trial writing area of said recording medium.

4. An optical disk drive according to claim 1, further comprising means for picking up said transition level of reproduction signals by said trial writing pattern.

5. An optical disk drive for recording information on a recording medium by forming optical recording marks, comprising:
    a timing generating circuit which generates a recording clock based on an electrical signal obtained by converting a reflected beam from said recording medium;
    a light source which irradiates a light pulse on a specific trial writing area of said recording medium in synchronization with said recording clock, said specific trial writing area having a pattern longer than a light spot diameter;
    a recording circuit which records a trial writing pattern in said specific trial writing area of said recording medium in synchronism with said recording clock;
    a reproducing circuit which reproduces the trial writing pattern from the reflected beam from said recording medium in accordance with said recording clock; and
    a controlling circuit which controls a recording power of the light pulse in accordance with an output of said reproducing circuit.

6. An optical disk drive according to claim 5, further comprising an erasing circuit which erases data on a track to be used for the recording of the trial writing pattern and on tracks which adjacent to said track, prior to recording the trial writing pattern.

7. An optical disk drive according to claim 5, further comprising means for recording a recording pattern not appearing in a data area, in said specific trial writing area of said recording medium.

8. An optical disk drive for recording information on a recording medium by forming optical recording marks, comprising:
    a timing generating circuit which generates a recording clock based on an electrical signal obtained by converting a reflected beam from said recording medium;
    a light source which irradiates a light pulse on an area of said recording medium in synchronism with said recording clock;
    a recording circuit which records information in said area of said recording medium with said light pulse in synchronism with said recording clock.

9. An optical disk drive according to claim 8, further comprising an erasing circuit which erases data on a track to be used for the recording of the trial writing pattern and on tracks which are adjacent to said track, prior to the recording of the trial writing pattern.

10. An optical disk drive according to claim 8, further comprising means for enabling recording a recording pattern not appearing in a data area in said specific trial writing area of said recording medium.

11. An optical disk drive according to claim 8, further comprising means for picking up said transition level of reproduction signals by said trial writing pattern.

* * * * *